3,559,198
FREQUENCY RESPONSIVE MONITOR FOR A
     REDUNDANT CONTROL SYSTEM
Harold Moreines, Springfield, and Gunter J. Gessner,
  Maywood, N.J., assignors to The Bendix Corporation,
  a corporation of Delaware
         Filed Apr. 25, 1966, Ser. No. 545,027
              Int. Cl. G08b 21/00
U.S. Cl. 340—248                            7 Claims

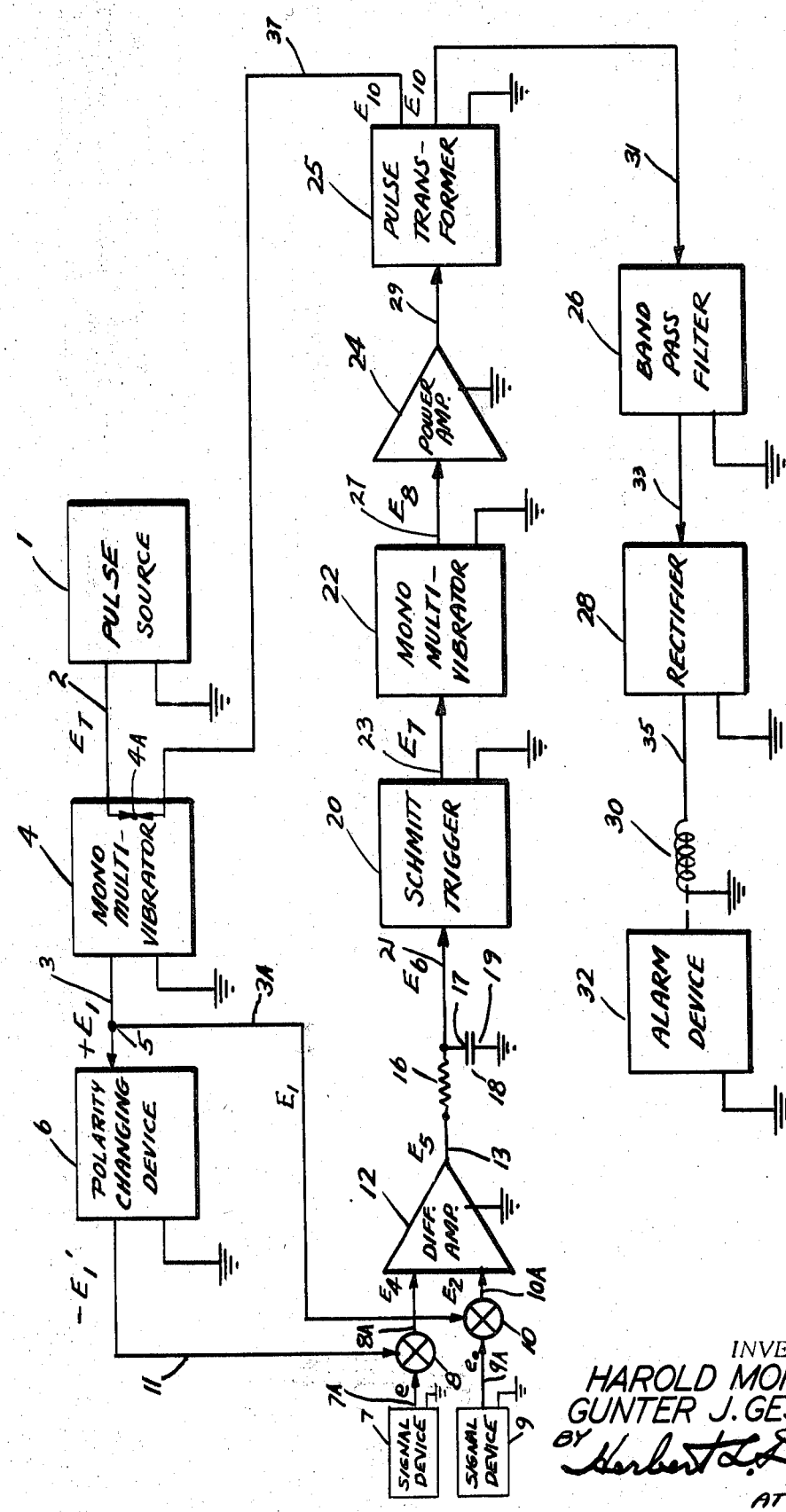

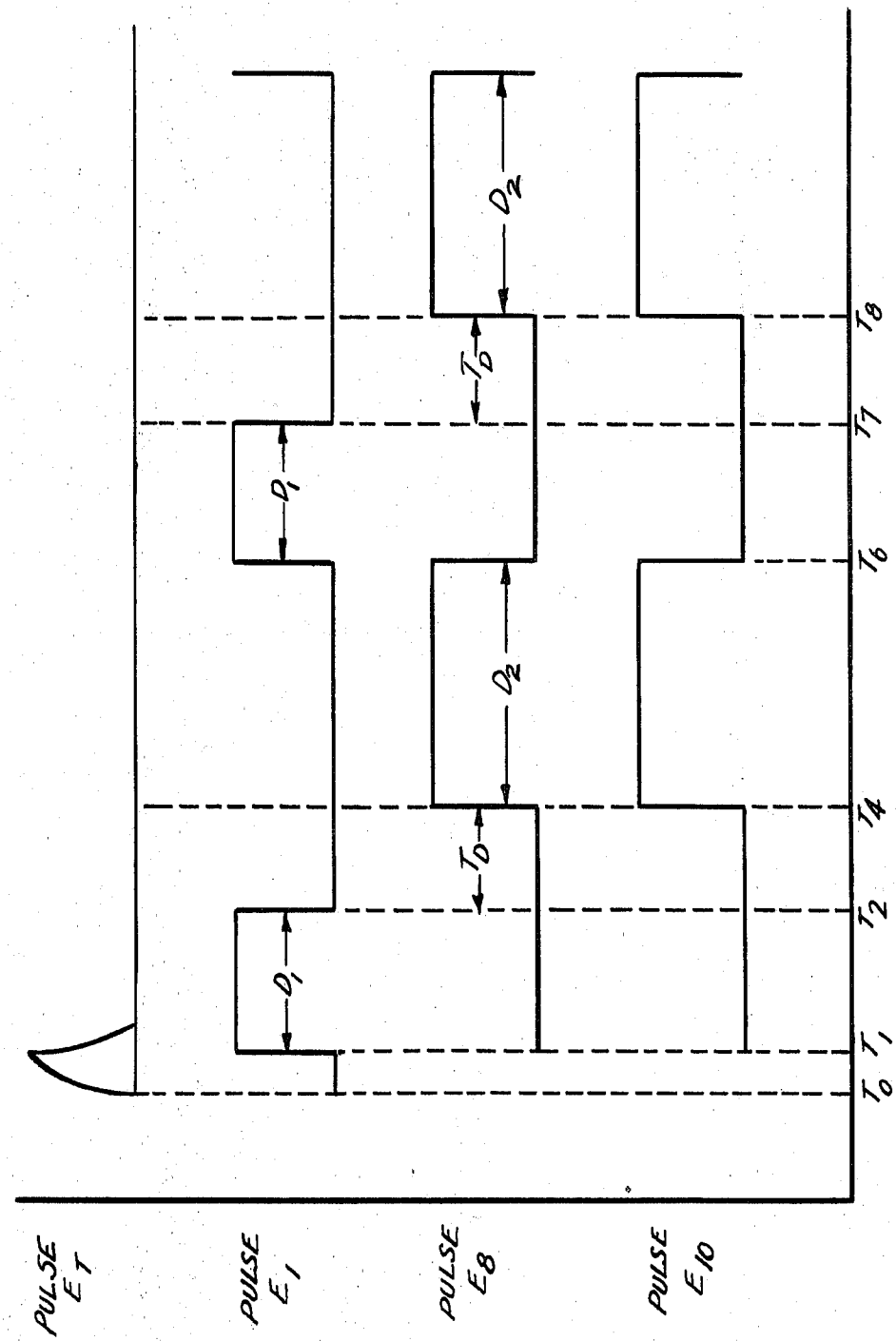

ABSTRACT OF THE DISCLOSURE

Apparatus for monitoring a control system providing redundant signals, comprising first means for providing an output at a predetermined frequency, and second means for comparing the redundant signals provided by the control system. The second means is connected to the first means for rendering said first means effective to provide an output at a frequency other than the predetermined frequency when the difference between the compared signals exceeds a predetermined limit, whereupon an alarm is actuated for signalling a system malfunction.

---

This invention relates to signal monitoring devices and more particularly, to a monitoring device for comparing two direct current or demodulated alternating current input signals and for providing a discrete output change when the difference between the input signals exceeds a predetermined limit.

Dual channel control systems providing corresponding signals require monitors for detecting differences between the signals in excess of a predetermined limit. The monitor must be fail safe and, for universal application, must be capable of comparing direct current or demodulated alternating current signals.

One object of this invention is to provide a monitor network for a dual channel control system which detects the difference between two input signals and indicates when the difference exceeds a predetermined limit.

Another object of this invention is to include, in a monitor network, a comparator for comparing input signals and for providing an output at a predetermined frequency. If the difference between the input signals exceeds a predetermined limit or if there is a monitor component failure, the predetermined frequency will change or be interrupted, and an alarm device will be operated.

Another object of this invention is to include, in a monitor network, a tuned passive filter which is responsive to the output of the monitor network, with the filter attenuating monitor outputs having a frequency other than a predetermined frequency. Significant changes in monitor gain which reduce the sensitivity of the monitor to an unsafe level, or increase the sensitivity to a nuisance level, will cause the monitor outputs to be provided at a frequency other than the predetermined frequency, with the filter attenuating these outputs and the attenuated outputs causing de-energization of a relay to operate an alarm device.

Another object of this invention is to provide a monitor network having an input and an output section. The input section compares dual channel input signals and provides a square wave output at a predetermined frequency. The output section includes a relay that is energized by the output from the input section of the network. The relay is arranged to operate an indicator, if the difference between the input signals exceeds a predetermined limit, or if there is an internal monitor failure.

This invention contemplates a device for monitoring a control system providing input signals, comprising first means for providing an output at a predetermined frequency; second means for comparing the input signals provided by the control system, and connected to the first means for rendering the first means effective to provide an output at a frequency other than the predetermined frequency when the difference between the compared signals exceeds a predetermined limit; and means connected to the first means for indicating when the output therefrom is provided at the other frequency.

These and other objects and features of the invention are pointed out in the following description in terms of the embodiment thereof which is shown in the accompanying drawings. It is to be understood, however, that the drawings are for illustration purposes only and are not a definition of the limits of the invention, reference being had to the appended claims for this purpose.

In the drawings:

FIG. 1 is an electrical schematic diagram of a monitor constructed in accordance with the present invention.

FIG. 2 is a graphical representation of the timing sequence of electrical outputs provided by the monitor constructed in accordance with the electrical schematic diagram of FIG. 1.

At a time designated as $t_0$ in the graphical representation of FIG. 2, an oscillating cycle is started by a pulse $E_T$ having a positive saw toothed wave form, as shown in FIG. 2, and applied through a conductor 2 from a pulse source designated by the numeral 1 in FIG. 1. Pulse $E_T$ is applied to a control input 4A of a monostable multivibrator 4. Monostable multivibrator 4 is of the type generally shown and described at p. 200, Basic Theory and Application of Transistors, Department of the Army, 1959, and has a stable and an unstable state. Monostable multivibrator 4 is initially in its stable state and is triggered to its unstable state by the pulse $E_T$ applied through conductor 2 to the control input 4A. Monostable multivibrator 4 remains in the unstable state for an interval $T_1$ to $T_2$, shown in the graphical representation of FIG. 2, reverting at the time $T_2$ to its stable state after a predetermined delay period and providing at an output conductor 3, a positive pulse $E_1$ having a pulse width $D_1$, as shown in FIG. 2, determined by the interval between the times $T_1$ and $T_2$.

The positive pulse $E_1$ from monostable multivibrator 4 is applied, through the conductor 3 and through a conductor 3A joining the conductor 3 at a point 5, to a summation means 10, and is applied through the conductor 3 to a polarity changing device 6. Polarity changing device 6 provides at an output conductor 11 a negative pulse $E_1'$ having an opposite polarity to that of the positive pulse $E_1$, but corresponding in amplitude and pulse width to the pulse $E_1$. Pulse $E_1'$ is applied to a summation means 8 through the output conductor 11 of the sign changing device 6.

The system monitored by the device of the present invention may be a dual channel aircraft control system including a signal device 7 for providing a direct current or demodulated alternating current aircraft control signal $e$ and including a signal device 9 for providing a direct current or demodulated alternating current signal $e_0$ corresponding to signal $e$. When the aircraft control system is operating properly, signal $e$ from signal device 7 and signal $e_0$ from signal device 9 are of the same polarity and differ in amplitude within a predetermined limit. When a system malfunction occurs, that is if the difference between the direct current or demodulated alternating current signals $e$ and $e_0$ exceeds the predetermined limit, or if the signals $e$ and $e_0$ are of opposite polarities, the monitoring device of the present invention brings into operation an alarm device 32, as hereinafter described.

Signal $e$ from signal device 7 is applied through an output conductor 7A to the summation means 8, and combined thereat with the negative signal $E_1$ applied from sign changing device 6 through the output conductor 11. Summation means 8 provides at an output conductor 8A a pulse $E_4$. Signal $e_0$ is applied through an output conductor 9A to the summation means 10 and combined thereat with the positive pulse $E_1$ applied from monostable multivibrator 4 through the output conductor 3 and the conductor 3A joining the conductor 3 at the point 5. Summation means 10 provides at an output conductor 10A a pulse $E_2$. The magnitude and polarity of pulses $E_2$ and $E_4$ depends on the magnitude and polarity of signals $e_0$ and $e$ respectively.

Pulse $E_4$ from summation means 8 is applied through the output conductor 8A to a differential amplifier 12 and pulse $E_2$ from the summation means 10 is applied through an output conductor 10A to the differential amplifier 12. Differential amplifier 12 algebraically subtracts pulse $E_4$ from pulse $E_2$ and provides at the time $T_2$ a pulse $E_5$ at an output conductor 13.

The pulse $E_5$ from the differential amplifier 12 is then applied, through the output conductor 13 and a resistor 16, to a plate 17 of a capacitor 18, while an opposite plate 19 of the capacitor 18 is connected to ground. Capacitor 18 charges to the level of pulse $E_5$ during a time interval in accordance with the amplitude of pulse $E_5$ to provide a triangular shaped ramp $E_6$ at a conductor 21. Ramp $E_6$ is applied through the conductor 21 to a Schmitt trigger 20. Schmitt trigger 20 is of the type such as that generally shown and described at pp. 431–434 of Electronics for Scientists, Malmstadt et al., Benjamin, 1963, being in a "disabled" state when the ramp $E_6$ is below a predetermined threshold level and triggered to its "enabled" state when ramp $E_6$ equals or exceeds the threshold level, thereupon providing at an output conductor 23 a pulse $E_7$. The Schmitt trigger 20 remains in the "enabled" state, acting to provide the output pulse $E_7$ until capacitor 18 is discharged below the threshold level of Schmitt trigger 20, Schmitt trigger 20 thereupon reverting to the "disabled" state terminating the output pulse $E_7$.

The pulse $E_7$ is applied through the conductor 23 to a monostable multivibrator 22 which is of a type similar to monostable multivibrator 4, and is triggered by pulse $E_7$ to its unstable state. Monostable multivibrator 22 remains in the unstable state for the time $D_2$ shown in FIG. 2, at the end of which time the monostable multivibrator 22 reverts to the stable state so as to provide at an output conductor 27 a pulse $E_8$. Thus the monostable multivibrator 22 reverts to its stable state at time $T_6$ shown in the graphical representation of FIG. 2 to complete an oscillating cycle of the monitoring device.

Pulse $E_8$ is applied through the conductor 27 to a power amplifier 24 and the amplified pulse $E_8$ is applied through an output conductor 29 to a pulse transformer 25. Pulse transformer 25 is of the type having dual secondary windings, with each of the secondary windings providing a pulse $E_{10}$. One of the pulses $E_{10}$ is applied through a conductor 31 to a band pass filter 26. Band pass filter 26 is tuned to pass pulses $E_{10}$ of a predetermined natural frequency and to attenuate pulses of other frequencies. The output of band pass filter 26 is applied through a conductor 33 to a rectifier 28, with the output of rectifier 28 applied through a conductor 35 to a relay 30 which controls as alarm device 32.

When pulse $E_{10}$ applied through conductor 31 is of the aforenoted predetermined natural frequency, thus indicating proper operation of the control system as will be hereinafter explained, pulse $E_{10}$ passes through band pass filter 26 unattenuated so that relay 30 is energized by the output of rectifier 28 whereupon the alarm device 32 is actuated to an "off" state. When pulse $E_{10}$ applied through conductor 31 is of a natural frequency other than the predetermined natural frequency, the pulse $E_{10}$ is attenuated by band pass filter 26 so that relay 30 will be de-energized by the output from rectifier 28, whereupon the alarm device 32 is actuated to an "on" state thereby indicating a system malfunction.

The other pulse $E_{10}$ is applied through a conductor 37 to monostable multivibrator 4. When the pulse $E_{10}$ applied through conductor 37 is provided at the predetermined natural frequency, operation of the monitor at this frequency is sustained until a system failure occurs.

OPERATION

The operation of the monitor of the present invention is best illustrated with reference to the following chart.

| Row | $E_1$ | $E_1'$ | $e_0$ | $e$ | $E_2$ ($E_1+e_0$) | $E_4$ ($E_1'+e$) | $E_5$ ($E_2-E_4$) |
|---|---|---|---|---|---|---|---|
| 1 | +0.5 | −0.5 | +0.1 | +0.1 | +0.6 | −0.4 | +1.0 |
| 2 | +0.5 | −0.5 | −0.7 | −0.7 | −0.2 | −1.2 | +1.0 |
| 3 | +0.5 | −0.5 | +0.3 | −0.3 | +0.8 | −0.8 | +1.6 |
| 4 | +0.5 | −0.5 | +1.2 | +0.2 | +1.7 | −0.3 | +2.0 |
| 5 | +0.5 | −0.5 | −1.2 | +0.2 | −0.7 | −0.3 | −0.5 |

For purposes of illustration the threshold level of Schmitt trigger 20 is assumed to be +1.0 volt. Pulse $E_1$ from monostable multivibrator 4, applied to summation means 10 through the conductor 3 and the conductor 3A joining the conductor 3 at the point 5, has an amplitude of +0.5 volt, and the pulse $E_1'$ from polarity changing device 6, applied to summation means 8 through the conductor 11, has an amplitude of −0.5 volt. Capacitor 18 is charged to the level of the algebraic subtraction $$(E_1-E_1')$$

Pulses $E_1$ and $E_1'$ correspond in amplitude but are of opposite polarities as heretofore noted. With reference to row 1 of the aforenoted chart, signal $e$ from signal device 7, applied to summation means 8 through the conductor 7A, has an amplitude of +0.1 volt and signal $e_0$ from signal device 9 applied through the conductor 9A to summation means 10, has an amplitude of +0.1 volt. Signal $e$ and signal $e_0$ are equal in amplitude and are of the same polarity, thus indicating proper operation of the control system monitored by the present invention. The output pulse $E_4$ of summation means 8, applied to differential amplifier 12 through the conductor 8A, corresponds to the summation $(E_1'+e)$ and is indicated as −0.4 volt at row 1 of the aforenoted chart. The output pulse $E_2$ of summation means 10 and applied to differential amplifier 12 through the conductor 10A corresponds to the summation $(E_1+e_0)$ and is indicated as +0.6 volt at row 1. Differential amplifier 12 provides at the time $T_2$ shown in the graphical representation of FIG. 2 the pulse $E_5$ which corresponds to the algebraic difference $(E_2-E_4)$, with this difference indicated at row 1 of the aforenoted chart as +1.0 volt. Pulse $E_5$ at +1.0 volt corresponds in magnitude and polarity to the threshold level of Schmitt trigger 20.

Capacitor 18 is charged to the level of the pulse $E_5$ during the time interval $T_2$ to $T_4$, otherwise shown as $T_D$ in the graphical representation of FIG. 2, and provides at the conductor 21 the ramp $E_6$ at the time $T_4$. Schmitt trigger 20 is triggered to its "enabled" state by the ramp $E_6$ applied through conductor 21, thereby providing at the output conductor 23 the pulse $E_7$. Pulse $E_7$ triggers monostable multivibrator 22 to its unstable state, with monostable multivibrator 22 providing at the output conductor 27 the pulse $E_8$ during the time interval $T_4$ to $T_6$, otherwise shown as $D_2$, in the graphical representative of FIG. 2.

As long as signal $e$ from signal device 7 and signal $e_0$ from signal device 9 are equal in amplitude and of the same polarity, as indicated at rows 1 and 2 of the aforenoted chart, Schmitt trigger 20 will be triggered to its "enabled" state at the time $T_4$. Pulse $E_8$ will be provided at a predetermined natural frequency measured by the time interval $D_1+T_D+D_2$, and the oscillating cycle of the monitor at this frequency will be sustained.

If, during the time interval $T_6$ to $T_7$ shown in FIG. 2, the pulse $e$ from signal device 7 and the pulse $e_0$ from signal device 9 are equal in amplitude but of opposite polarities as indicated at row 3 of the aforenoted chart, the amplitude of pulse $E_5$ will exceed the 1.0 volt threshold level of Schmitt trigger 23. The charging time $T_D$ of capacitor 18 will decrease, thus causing pulse $E_8$ at the output conductor 27 of monostable multivibrator 22 to be initiated at a time before the time $T_8$ shown in FIG. 2 to change the oscillating cycle of the monitor. Pulse $E_8$ will be applied to pulse transformer 25, with pulse $E_{10}$ provided at the output conductor 31 of pulse transformer 25 attenuated by band pass filter 26 as heretofore noted. Alarm device 32 will be actuated to the "on" state to indicate a system failure.

Similarly if, during the time interval $T_6$ to $T_7$, signal $e$ from signal device 7 and signal $e_0$ from signal device 9 are of the same polarity but differ in amplitude by at least the threshold level of Schmitt trigger 20, as indicated at row 4 of the aforenoted chart, the amplitude of pulse $E_5$ will exceed the threshold level of Schmitt trigger 20, thereby changing the charging time $T_D$ of capacitor 18 and causing pulse $E_8$ to be provided at a frequency other than the frequency measured by the time interval $$D_1 + T_D + D_2$$

A system failure will again be indicated by alarm device 32.

If, during the time intervals $T_6$ and $T_7$, the condition exists as indicated in row 5 of the aforenoted chart, whereby signal $e_0$ from signal device 9 and signal $e$ from signal device 7 differ in amplitude by at least the threshold level of Schmitt trigger 20 and are of opposing polarities, pulse $E_5$ will have a negative polarity relative to the threshold level of Schmitt trigger 20. Schmitt trigger 20 will not be triggered to its "enabled" state, the oscillating cycle of the monitor will be interrupted, and a system failure will be indicated by alarm device 32.

The operating modes of the control system illustrated in the aforenoted chart are merely exemplary and indicate typical control system conditions detected by the monitor of the present invention. It should be noted that internal monitor failures as well will change the natural frequency at which the pulse $E_8$ is provided, or will interrupt the oscillating cycle of the monitor causing alarm device 32 to indicate a failure. Typical of these monitor failures is a failure of amplifier 32 wherein a change in gain occurs. The charging time $T_D$ of capacitor 18 will thus change, causing pulse $E_8$ to be provided at a frequency other than the frequency measured by the time interval $D_1 + T_D + D_2$, with pulse $E_{10}$ being attenuated by filter 26 causing alarm device 32 to be actuated to the "on" state. If capacitor 18 is open or if resistor 16 is shorted, the frequency measured by the time interval $D_1 + T_D + D_2$ will change. Any failure in band pass filter 26 will change the aforenoted frequency causing relay 30 to actuate alarm device 32 to the "on" state to indicate a system failure.

Signals $e$ and $e_0$ may be either direct current or demodulated alternating current signals with the monitor of the present invention detecting differences in amplitude in excess of the threshold level of Schmitt trigger 20 as well as differences in polarity. Pulse $E_{10}$ is fed back to monostable multivibrator 4, and if pulse $E_{10}$ is provided at the frequency measured by the time interval $D_1 + T_D + D_2$, the cycling of the monitor at this frequency is sustained. If the difference between signals $e_0$ and $e$ exceeds the threshold of Schmitt trigger 23, if the signals are of different polarities, or if there is a monitor failure, the oscillating cycle of the monitor will change and alarm device 32 will be actuated to the "on" state to indicate a failure.

What is claimed is:

1. In a control system of the type including means for providing a pair of redundant control signals, a monitoring device comprising:
a signal source for providing a starting signal;
an oscillator connected to the signal source and responsive to the starting signal for providing a signal in a predetermined sense;
first summation means connected to the oscillator and to the redundant control signal means for summing the signal in the predetermined sense with one of the redundant control signals and for providing a summation signal;
a polarity changing device connected to the oscillator and responsive to the signal in the predetermined sense for providing a signal in an opposite sense;
second summation means connected to the polarity changing device for summing the signal in the opposite sense with the other of the redundant control signals and for providing a summation signal;
means connected to the first and second summation means for comparing the summation signals therefrom and for providing a signal corresponding to the difference therebetween;
means connected to the comparing means and responsive to the difference signal therefrom for providing a ramp output;
first means having a predetermined threshold connected to the ramp output means for being enabled by the ramp output therefrom above the threshold and disabled by the ramp output below the threshold, and for providing a first pulse upon being so enabled and disabled;
second means connected to the first means and responsive to the first pulse for providing a second pulse, said second pulse being at a predetermined frequency when the redundant signals correspond and being at a frequency other than the predetermined frequency when said correspondence is lacking;
alarm means; and
means connected to the alarm means and to the second means and responsive to the second pulse at the frequency other than the predetermined frequency for actuating the alarm means.

2. In a control system of the type including means for providing a pair of redundant control signals, a monitoring device for the control system, comprising:
oscillating means for providing a signal in a predetermined sense;
first summation means connected to the oscillating means and to the redundant control signal means for summing the signal in a predetermined sense with one of the redundant control signals, and for providing a first summation signal;
polarity changing means connected to the oscillating means and responsive to the signal in the predetermined sense for providing a signal in the opposite sense;
second summation means connected to the polarity changing means and to the redundant control signal means for summing the signal in the opposite sense with the other of the redundant control signals, and for providing a second summation signal;
means connected to the first and second summation means for providing a controlling pulse at a predetermined frequency when the signals from said first and second summation means correspond, and for providing the controlling pulse at a frequency other than the predetermined frequency when said correspondence is lacking;
alarm means; and
means connected to the alarm means and to the controlling pulse means and responsive to the controlling pulse at the frequency other than the predetermined frequency for actuating the alarm means.

3. A monitoring device as described by claim 2, wherein the controlling pulse means includes:
a comparator connected to the first and second summation means for comparing the signals therefrom and for providing a signal corresponding to the difference therebetween;

capacitor means connected to the comparator for alternately charging to the level of the difference signal and discharging to provide a ramp output;

means having a predetermined threshold and connected to the capacitor means and responsive to the ramp output for being enabled when the ramp is above the threshold and disabled when the ramp is below the threshold to provide an output pulse; and a multivibrator connected to the last mentioned means and driven by the output pulse therefrom to provide the controlling pulse.

4. A monitor device as described by claim 2, including:

the controlling pulse means being connected to the first and second summation means for providing the controlling pulse at the predetermined frequency when the first and second summation signals correspond;

means for connecting the multivibrator to the controlling pulse means; and the controlling pulse at the predetermined frequency being applied to the multivibrator through said connecting means for sustaining operation of the multivibrator.

5. A monitor as described by claim 2, wherein the means connected to the alarm means and to the controlling pulse means and responsive to the controlling pulses therefrom at the frequency other than the predetermined frequency for actuating the alarm means includes:

a power amplifier connected to the controlling pulse means for amplifying the controlling pulses therefrom;

a pulse transformer connected to the power amplifier;

means connected to the pulse transformer for attenuating pulses at frequencies other than the predetermined frequency;

a rectifier connected to the attenuating means for rectifying the attenuated pulses therefrom; and a relay connected to the rectifier and to the alarm means and responsive to the rectified attenuated pulses for actuating the alarm.

6. A monitoring device as described by claim 2 wherein the oscillating means for providing a signal in a predetermined sense includes:

a signal source for providing a starting signal; and a multivibrator connected to the signal source and responsive to the starting signal for providing the signal in the predetermined sense as a pulse train.

7. A monitor as described by claim 4, wherein the means for connecting the multivibrator to the controlling pulse means includes:

a power amplifier connected to the controlling pulse means for amplifying the controlling pulse therefrom; and a pulse transformer connected to the power amplifier and to the multivibrator for applying the amplified pulses to the multivibrator.

References Cited

UNITED STATES PATENTS

| | | | |
|---|---|---|---|
| 2,987,712 | 6/1961 | Polyzou | 340—213 |
| 3,119,064 | 6/1964 | Hillis | 340—133 |
| 3,134,076 | 5/1964 | Haner et al. | 328—133 |
| 3,205,438 | 9/1965 | Buck | 328—133 |
| 3,219,935 | 11/1965 | Katakami | 328—133 |
| 3,372,335 | 3/1968 | Takada | 340—171 |
| 3,382,376 | 5/1968 | Sowden | 328—133 |

THOMAS B. HABECKER, Primary Examiner

D. MYER, Assistant Examiner

U.S. Cl. X.R.

328—148; 340—171, 213